United States Patent [19]

Bueschl et al.

[11] Patent Number: 5,008,341
[45] Date of Patent: Apr. 16, 1991

[54] TRANSPARENT THERMOPLASTIC BLENDS

[75] Inventors: Rainer Bueschl, Roedersheim-Gronau; Peter Klaerner, Battenberg, both of Fed. Rep. of Germany

[73] Assignee: BASF Aktiengesellschaft, Ludwigshafen, Fed. Rep. of Germany

[21] Appl. No.: 401,239

[22] Filed: Aug. 31, 1989

[30] Foreign Application Priority Data

Sep. 20, 1988 [DE] Fed. Rep. of Germany ....... 3831874

[51] Int. Cl.$^5$ .................. C08L 33/06; C08L 45/00; C08L 25/02; C08L 27/08
[52] U.S. Cl. .................................. 525/216; 525/227; 525/228; 525/238; 525/241; 525/239
[58] Field of Search ............... 525/228, 227, 216; 525/228, 227, 216

[56] References Cited

U.S. PATENT DOCUMENTS 3,297,794 1/1967 Imai et al. ........................ 525/262
4,159,288 6/1979 Carson et al. .................... 525/228
4,277,573 7/1981 Iizuka et al. ..................... 525/228
4,849,479 7/1989 Siol et al. ......................... 525/228
4,898,912 2/1990 Siol et al. ......................... 525/216

FOREIGN PATENT DOCUMENTS 3632369 9/1988 Fed. Rep. of Germany .
2202229 9/1988 United Kingdom .

Primary Examiner—Marion E. McCamish
Assistant Examiner—Susan Berman
Attorney, Agent, or Firm—Oblon, Spivak, McClelland, Maier & Neustadt

[57] ABSTRACT

A transparent polyblend is formed from
(a1) 99.9–0.1% by weight of a methyl (meth)acrylate homopolymer or of a copolymer thereof with up to 20% by weight of units of alkyl (meth)acrylate having an alkyl radical of from 2 to 10 carbon atoms and up to 10% by weight of further comonomers or
(a2) 99.9–0.1% by weight of a styrene or α-methylstyrene and acrylonitrile copolymer containing from 5 to 30% by weight of units of acrylonitrile or
(a3) 99.9–0.1% by weight of a possibly impact-modified polyvinyl chloride homopolymer or copolymer with up to 20% by weight of comonomers and
(b) 0.1–99.9% by weight of a cycloalkyl (meth)acrylate homopolymer or copolymer with up to 99.9% by weight of units of methyl methacrylate.

10 Claims, No Drawings

TRANSPARENT THERMOPLASTIC BLENDS

There is an evident demand for transparent polymeric products for a wide variety of use, for example in packaging. Transparent polyproducts frequently need to be modified in certain respects in order to develop new uses for the products. Properties which need to be improved are for example the heat distortion resistance, the adhesion and the stability to light.

It is in general difficult or even impossible to obtain the desired combination of properties with a chemically uniform polymer. There is therefore an increasing trend toward obtaining the desirable properties by combining different polymers by blending.

It is known, then, that chemically different polymers are in general incompatible with one another, i.e. that they are not miscible with one another or soluble in one another by the standards of low molecular weight chemistry. For this reason, physical blends of most polymers, prepared for example in the melt, are usually opaque, i.e. non-transparent. The theory and practice of polymer compatibility and blending are described in Polymer Blends, volumes 1 and 2, by D. R. Paul and Seymour Newman (New York, San Francisco, London 1978).

Transparent blends of incompatible polymers are only obtained if the refractive indices of the individual components do not differ by more than ±0.005 (according to U.S. Pat. No. 4,083,896), or in the relatively rare cases where the components of a mixture are thermodynamically compatible with one another. Polymethyl methacrylate and various styrene acrylonitrile copolymers do meet these conditions over a wide range, although polymethyl methacrylate on the one hand and copolymerized styreneacrylonitriles on the other have different refractive indices. Their blend compatibility is evidently the result of compatibility of two components on a molecular level (FR Patent 1,526,375).

A further example of molecularly compatible polymer blends, or polyblends, is described in U.S. Pat. No. 4,508,871: transparent blends of styrene/acrylic acid copolymers with polymethyl methacrylate or with styrene/acrylonitrile copolymer and even impact-modified derivatives thereof. It is pointed out that further compatible and hence transparent polyblends could be accessible, including for example blends based on polymethyl methacrylate and derivatives of methacrylic acid, in order to retain for example the higher weathering stability of methacrylic acid derivatives and at the same time ensure transparence of the blend product. However, no example is mentioned, probably because none was known.

It is also known that polymers of cyclohexyl methacrylate or acrylate and copolymers thereof with methyl methacrylate are molecularly compatible with polystyrene (cf. DE 3,632,369).

It is object of the present invention to provide further molecularly compatible polyblends which, owing to the property of molecular compatibility, provide transparent products and hence open up the possibility of new combinations of properties.

We have found that this object is achieved by transparent polyblends based on polymethyl methacrylate, styrene/acrylonitrile copolymers or polyvinyl chloride as component A and a component B, which is essential for the invention, based on cycloalkyl acrylates or methacrylates or copolymers thereof with methyl methacrylate.

The present invention accordingly provides immediately a transparent polyblend formed from (a1) 99.9–0.1% by weight of a methyl (meth)acrylate homopolymer or of a copolymer thereof with up to 20% by weight of units of alkyl (meth)acrylate having an alkyl radical of from 2 to 10 carbon atoms and up to 10% by weight of further comonomers or (a2) 99.9–0.1% by weight of a styrene or α-methylstyrene and acrylonitrile copolymer containing from 5 to 30% by weight of units of acrylonitrile or (a3) 99.9–0.1% by weight of a possibly impact-modified vinyl chloride homopolymer or copolymer with up to 20% by weight of comonomers and (b) 0.1–99.9% by weight of a cycloalkyl (meth)acrylate homopolymer or copolymer with up to 99.9% by weight of units of methyl methacrylate.

The preferred cycloalkyl (meth)acrylate is cyclohexyl (meth)acrylate. Economically it is also useful to use cyclopentyl (meth)acrylate as a monomeric unit. The cycloalkyl (meth)acrylate can be monosubstituted or disubstituted by $C_1$–$C_4$-alkyl in the ring.

The present invention thus rests on the surprising observation that the polycyclohexyl acrylate/polystyrene compatibility known from DE 3,632,369 is widely generalizable. This is surprising because it is known (G. L. Molau, Polymer Letters 3 (1965), 1007–1015; R. Casper, L. Morbitzer, Angew. Makromol. Chem. 58/59 (1977), 1–35) that SAN copolymers are no longer miscible with one another if there are just a few percent difference in the acrylonitrile (AN) content. It is therefore not trivial to assume that the compatibility of a polymer (here for example polycyclohexyl methacrylate) with polystyrene (DE-A-3,632,369) permits the inference that consequently for example even SAN copolymers having AN contents of up to 25–30% will be miscible therewith at a molecular level.

According to the invention, the methyl (meth) acrylate copolymers (a1) can be for example copolymers of methyl methacrylate with up to 50% by weight of alkyl acrylates having alkyl chains of from 2 to 10 carbon atoms.

Preference is given to alkyl acrylate contents of below 15% by weight.

The styrene/acrylonitrile copolymers (a2) can be copolymers containing up to 30% by weight of AN. Preference is given to AN copolymers containing up to 25% by weight of acrylonitrile; particular preference is given to copolymers containing up to 15% by weight of acrylonitrile.

The vinyl chloride polymer can be a commercial PVC grade with or without impact modification.

EXAMPLES

Preparation of cyclohexyl methacrylate homopolymers and copolymers

To prepare small amounts of homopolymers and copolymers of cyclohexyl methacrylate, the polymerization was carried out batchwise in a pressure reactor. To this end, the monomer, or the mixture of monomers, was introduced and admixed with 0.1% of benzoyl peroxide, 0.1% of dicumyl peroxide and 0.2% of tert-dodecylmercaptan. The contents were then purged 4 times with nitrogen, the reactor was sealed, and the polymerization was carried out according to the following temperature profile: 24 hours at 80° C., 8 hours at 100° C., 8 hours at 120° C. and finally a further 8 hours at 140° C. The end products contained less than 2% of volatiles.

A larger amount of homopolymer or copolymer is obtained as follows:

A 5-1 metal vessel equipped with a horseshoe stirrer is charged with 1900 g of monomer or monomer mixture together with 0.2% of tert-dodecylmercaptan and 0.1% of benzoyl peroxide, and the contents are stirred at 80°–85° C. at 200 rpm. A conversion rate of 10% per hour becomes established. When the solids content is 40–50%, 1800 g of water are added together with 36 g of commercial protective colloid (Luviskol K 90) and 1.8 g of sodium phosphate, and the polymerization is completed in suspension. At this stage the stirrer speed is 300 rpm, and the temperature is increased from 3 hours each at 110° C. and 130° C. to 4 hours at 140° C. The beads are separated off, washed and then dried at 60° C. under reduced pressure.

In both versions of the process, the reaction was virtually complete, so that the composition of the polymers corresponds to the mixture of the monomers.

Preparation of polyblends

To prepare the blends, the constituents were dissolved separately in ethyl acetate, each in a concentration of 10% by weight, the solutions were mixed in a ratio of 1:1, and 3 ml portions of the mixtures were then freed from solvent in a small dish 5 cm in diameter. The remaining film was then assessed for transparence. The results of these assessments and the copolymers used are given in the Table below. The viscosity number VN was measured in accordance with German Standard Specification DIN 53726 on a 0.5% strength solution in chloroform at 23° C.

TABLE 1

Characteristics of blends of homopolymer or copolymers of MMA and cyclohexyl methacrylate (CH) and polyethyl methacrylate; comparison against polyisobutyl methacrylate (IBMA)

| Example | MMA | CHMA | VN [ml/g] | 1:1 blends with Degalan ® 8* |
|---|---|---|---|---|
| 1 | 100 | — | 78 | transparent |
| 2 | 90 | 10 | 75 | transparent |
| 3 | 80 | 20 | 73 | transparent |
| 4 | 70 | 30 | 76 | transparent |
| 5 | 60 | 40 | 76 | transparent |
| 6 | 50 | 50 | 72 | transparent |
| 7 | 40 | 60 | 74 | transparent |
| 8 | 30 | 70 | 69 | transparent |
| 9 | 20 | 80 | 72 | transparent |
| 10 | 10 | 90 | 71 | transparent |
| 11 | — | 100 | 68 | transparent |
| Comparison | (100 of IBMA) | | 74 | opaque |

*Degussa trade name for polymethyl methacrylate containing 1% of butyl acrylate as comonomer; VN: 57 ml/g As is evident from the table, all the 1:1 blends of polymethyl methacrylate with pure polycyclohexyl methacrylate and copolymers thereof with methacrylate are transparent. The molecular compatibility of the components can be deduced from the fact that for example pure polycyclohexyl methacrylate has a refractive index of 1.507, while pure PMMA has a refractive index of 1.490, the difference in the refractive indices thus being distinctly higher than the upper limit of 0.005 allowed for transparence of incompatible polymers. The evident compatibility of 2 esters of methacrylic acid is not a generalizable intrinsic property of esters of methacrylic acid. This is shown by the blend of polymeric isobutyl methacrylate (IBMA) with the commercial product. In this case, the film is not transparent, indicating an incompatible polyblend.

TABLE 2

Characteristics of blends of homopolymers and copolymers of MMA and cyclohexyl methacrylate (CHMA) and SAN

| Examples | MMA:CHMA | | VN [ml/g] | 1:1 blends with SAN* |
|---|---|---|---|---|
| 1 | 100 | — | 78 | transparent |
| 2 | 90 | 10 | 75 | transparent |
| 3 | 80 | 20 | 73 | transparent |
| 4 | 70 | 30 | 76 | transparent |
| 5 | 60 | 40 | 76 | transparent |
| 6 | 50 | 50 | 72 | transparent |
| 7 | 40 | 60 | 74 | transparent |
| 8 | 30 | 70 | 69 | transparent |
| 9 | 20 | 80 | 72 | transparent |
| 10 | 10 | 90 | 71 | transparent |
| 11 | — | 100 | 68 | transparent |
| Comparison | (100 of IBMA) | | 74 | opaque |

*LURAAN ® 35 N; commercial product from BASF AG, copolymer of 75% by weight of styrene and 25% by weight of acrylonitrile; VN in DMF: 80 ml/g.

As is evident from the table, all the 1:1 blends of SAN copolymers with pure polycyclohexyl methacrylate and copolymers thereof with methyl methacrylate are transparent. The molecular compatibility of the components can be deduced from the fact that for example pure polycyclohexyl methacrylate has a refractive index of 1.507 while the commercial product LURAN ® 358 N has a refractive index of 1.572, the difference in the refractive indices being distinctly higher than the upper limit of 0.005 allowed for the transparence of incompatible polymers. The evident compatibility of cycloalkyl esters of methacrylic acid with styrene/acrylonitrile copolymers is not a generalizable intrinsic property of esters of methacrylic acid. This is shown by a comparison of the blend of polymeric isobutyl methacrylate (IBMA) with the same SAN. In this case, the film is not transparent, indicating an incompatible polyblend.

The compatibility extends, as is shown below by Table 3, over a wide range of acrylonitrile levels in the styrene/acrylonitrile copolymers. These copolymers were prepared in a conventional manner by polymerization in a continuous stirred tank to ensure uniform chemical composition.

TABLE 3

| AN content of S/A copolymer in % by weight | VN in DMF [ml/g] | CHMA content of MMA/CHMA copolymer in % by weight | VN in CHCL$_3$ [ml/g] | Light transmittance characteristics of 1:1 blends |
|---|---|---|---|---|
| 7 | 71 | 25 | 69 | transparent |
| 11 | 76 | 25 | 69 | transparent |
| 15 | 78 | 25 | 69 | transparent |
| 18 | 76 | 25 | 69 | transparent |
| 35 | 75 | 25 | 69 | opaque |
| 7 | 71 | 50 | 74 | transparent |
| 11 | 76 | 50 | 74 | transparent |
| 15 | 78 | 50 | 74 | transparent |
| 18 | 76 | 50 | 74 | transparent |
| 35 | 75 | 50 | 74 | opaque |
| 7 | 71 | 75 | 73 | transparent |
| 11 | 76 | 75 | 73 | transparent |
| 15 | 78 | 75 | 73 | transparent |
| 18 | 76 | 75 | 73 | transparent |
| 35 | 75 | 75 | 73 | opaque |

Characteristics of blends of homopolymers and copolymers of MMA and cyclohexyl methacrylate (CHMA) and PVC

| Example | MMA:CHMA | | VN[1] [ml/g] | 1:1 blends with Vinoflex 6115* |
|---|---|---|---|---|
| 1 | 100 | — | 78 | transparent |
| 2 | 90 | 10 | 75 | transparent |
| 3 | 80 | 20 | 73 | transparent |
| 4 | 70 | 30 | 76 | transparent |
| 5 | 60 | 40 | 76 | transparent |
| 6 | 50 | 50 | 72 | transparent |
| 7 | 40 | 60 | 74 | transparent |
| 8 | 30 | 70 | 69 | transparent |
| 9 | 20 | 80 | 72 | transparent |
| 10 | 10 | 90 | 71 | transparent |
| 11 | — | 100 | 68 | transparent |
| Comparison | (100 of IBMA) | | 74 | opaque |

*Commercial product of BASF AG polyvinyl chloride homopolymer, K value according to German Standards Specification DIN 53726 = 61

As is evident from the table, all the 1:1 blends of polyvinyl chloride with pure polycyclohexyl methacrylate and copolymers thereof with methyl methacrylate are transparent. The molecular compatibility of the components can be deduced from the fact that for example pure polycyclohexyl methacrylate has a refractive index of about 1.507 while pure PVC has a refractive index of about 1.545, the difference in the refractive indices thus being distinctly higher than the upper limit of 0.005 allowed for the transparence of incompatible polymers. This is shown by a comparison with polyisobutyl methacrylate (IBMA) blended with polyvinyl chloride. In this case, the film is not transparent, indicating an incompatible polyblend.

We claim:

1. A transparent polyblend formed from
   (a) 99.9–0.1% by weight of a styrene or α-methyl styrene and acrylonitrile copolymer containing from 11 to 30% by weight of acrylonitrile monomer units, and
   (b) 0.1–99.9% by weight of a cycloalkyl (meth)acrylate homopolymer or copolymer with up to 99.9% by weight of units of methyl methacrylate.

2. The blend of claim 1, wherein copolymer (a) contains from 11 to 25 wt. % acrylonitrile.

3. The blend of claim 1, wherein copolymer (a) contains 15–30 wt. % acrylonitrile.

4. The blend of claim 1, wherein said copolymer (a) contains 18–30 wt. % acrylonitrile.

5. The blend of claim 1, wherein said cycloalkyl (meth)acrylate is cyclohexyl (meth)acrylate.

6. The blend of claim 5, wherein said cyclohexyl (meth)acrylate is $C_1$–$C_4$-alkyl monosubstituted or disubstituted in the cyclohexyl ring.

7. The blend of claim 1, wherein said polymer (b) comprises at least 25 wt. % methyl methacrylate.

8. The blend of claim 1, wherein polymer (b) comprises at least 50% by weight methyl methacrylate.

9. The blend of claim 1, wherein polymer (b) comprises at least 75% methyl methacrylate.

10. The blend of claim 1, wherein polymer (b) is a cycloalkyl (meth)acrylate homopolymer.

* * * * *